(12) United States Patent
Merz

(10) Patent No.: US 12,123,440 B2
(45) Date of Patent: Oct. 22, 2024

(54) EXPANSION CONNECTOR

(71) Applicant: Häfele Berlin GmbH & Co KG, Berlin (DE)

(72) Inventor: Ulrich Merz, Regensburg (DE)

(73) Assignee: Häfele Berlin GmbH & Co KG, Berlin (DE)

( * ) Notice: Subject to any disclaimer, the term of this patent is extended or adjusted under 35 U.S.C. 154(b) by 671 days.

(21) Appl. No.: 17/445,824

(22) Filed: Aug. 24, 2021

(65) Prior Publication Data

US 2021/0381538 A1 Dec. 9, 2021

Related U.S. Application Data

(63) Continuation of application No. PCT/EP2020/052556, filed on Feb. 3, 2020.

(30) Foreign Application Priority Data

Feb. 25, 2019 (DE) ...................... 20 2019 101 077.0

(51) Int. Cl.
*F16B 12/24* (2006.01)
*F16B 13/06* (2006.01)

(52) U.S. Cl.
CPC ............ *F16B 12/24* (2013.01); *F16B 13/065* (2013.01)

(58) Field of Classification Search
CPC ........ F16B 13/04; F16B 13/06; F16B 13/063; F16B 13/065; F16B 13/066; F16B 13/10; F16B 12/10; F16B 12/20; F16B 12/24; F16B 12/26; F16B 2012/103; F16B 2012/106; F16B 5/0084; F16B 5/0088; A47B 47/0075; A47B 47/042;
(Continued)

(56) References Cited

U.S. PATENT DOCUMENTS 4,131,376 A * 12/1978 Busse ................. F16B 12/2036
403/231
5,567,081 A * 10/1996 Vallance ............. F16B 12/2036
403/231
(Continued)

FOREIGN PATENT DOCUMENTS

CN 2334934 Y 8/1999
CN 2400619 Y 10/2000
(Continued)

*Primary Examiner* — Jonathan P Masinick
(74) *Attorney, Agent, or Firm* — Orbit IP, LLP

(57) ABSTRACT

An expansion connector connecting two furniture panels includes a bolt having a cylindrical bolt shaft with a bolt head opposite an expansion cone. A plastics expansion sleeve is mounted displaceably on the bolt having at least two expansion tabs, each of which has a radially outwardly protruding collar. The expansion sleeve can be transferred, by a displacement relative to the bolt, from a non-expanded starting position into an expanded end position where the expansion tabs are radially outwardly expanded. In the starting position, the expansion tabs bear against the bolt shaft by a guide portion and divides the expansion tabs into a first tab portion facing the bolt head and a second tab portion facing away from the bolt head. The first tab portions are radially spaced apart from the bolt shaft, and, in the end position, the expansion tabs are each pivoted about the edge of the guide portion.

18 Claims, 1 Drawing Sheet

(58) Field of Classification Search
CPC .... A47B 2230/0029; A47B 2230/0033; A47B 2230/0048
See application file for complete search history.

(56) References Cited

U.S. PATENT DOCUMENTS

| | | | | |
|---|---|---|---|---|
| 5,906,453 | A * | 5/1999 | Grieser | F16B 12/2036 403/409.1 |
| 6,276,867 | B1 * | 8/2001 | Vallance | F16B 12/2036 403/231 |
| 6,276,868 | B1 * | 8/2001 | Vallance | F16B 12/2036 403/231 |
| 6,866,455 | B2 * | 3/2005 | Hasler | F16B 5/0024 411/21 |
| 7,223,045 | B2 * | 5/2007 | Migli | F16B 12/2009 403/231 |
| 8,714,863 | B2 * | 5/2014 | Vallance | F16B 12/2036 403/245 |
| 10,584,732 | B2 * | 3/2020 | Walz | F16B 12/20 |
| 11,519,440 | B2 * | 12/2022 | Hagspiel | F16B 12/24 |
| 11,608,850 | B2 * | 3/2023 | von Wilcke | F16B 12/24 |
| 2005/0042027 | A1 | 2/2005 | Migli | |
| 2007/0160418 | A1 * | 7/2007 | Lo | F16B 13/02 403/275 |
| 2010/0074677 | A1 | 3/2010 | Vallance et al. | |
| 2012/0042502 | A1 | 2/2012 | Wenfeng et al. | |
| 2018/0031020 | A1 * | 2/2018 | Chen | F16B 12/24 |
| 2018/0066690 | A1 * | 3/2018 | Zimmer | F16B 21/20 |
| 2018/0209461 | A1 | 7/2018 | Walz et al. | |
| 2019/0055973 | A1 * | 2/2019 | Nitschmann | F16B 12/24 |
| 2019/0195258 | A1 * | 6/2019 | Zimmer | F16B 13/0858 |

FOREIGN PATENT DOCUMENTS

| | | | | |
|---|---|---|---|---|
| CN | 101915253 | A | 12/2010 | |
| CN | 102282378 | A | 12/2011 | |
| CN | 105443533 | A | 3/2016 | |
| CN | 108026955 | A | 5/2018 | |
| DE | 1922971 | A1 * | 11/1970 | |
| DE | 29722265 | U1 * | 3/1998 | F16B 12/24 |
| DE | 10108037 | A1 * | 9/2002 | E04B 1/2604 |
| DE | 102006003766 | A1 * | 8/2007 | F16B 12/26 |
| DE | 102013208494 | A1 * | 11/2013 | F16B 12/24 |
| DE | 20 2015 105 030 | U1 | 11/2015 | |
| EP | 0 510 906 | A2 | 10/1992 | |
| EP | 0 949 424 | A2 | 10/1999 | |
| EP | 1 310 684 | A2 | 5/2003 | |
| EP | 2 038 557 | A1 | 3/2009 | |
| EP | 2 848 825 | A1 | 3/2015 | |
| ES | 2 160 025 | A1 | 10/2001 | |
| IT | UB20 152 418 | A1 | 1/2017 | |
| JP | H03-074624 | A | 3/1991 | |
| JP | H03-078111 | U | 8/1991 | |
| JP | 2001-524185 | A | 11/2001 | |
| JP | 2016-113762 | A | 6/2016 | |
| WO | 2008/003456 | A1 | 1/2008 | |
| WO | WO-2014060608 | A2 * | 4/2014 | F16B 12/00 |
| WO | 2017 050446 | A1 | 3/2017 | |
| WO | 2018 001404 | A1 | 1/2018 | |
| WO | 2018 197219 | A1 | 11/2018 | |

* cited by examiner

EXPANSION CONNECTOR

CROSS-REFERENCE TO RELATED APPLICATIONS

This continuation application claims priority to PCT/EP2020/052556 filed on Feb. 3, 2020 which has published as WO 2020/173664 A1 and also the German application number 20 2019 101 077.0 filed on Feb. 25, 2019, the entire contents of which are fully incorporated herein with these references.

DESCRIPTION

Field of the Invention

The invention relates to an expansion connector for connecting two parts, in particular furniture panels, comprising a bolt with a cylindrical bolt shaft, with a bolt head at one bolt end and with an expansion cone, tapering in the direction towards the bolt head, at the other bolt end, and a plastics expansion sleeve which is displaceably mounted on the bolt and which has at least two expansion tabs, each of which has a radially outwardly protruding collar at their tab end facing the bolt head, wherein the expansion sleeve can be transferred, by a displacement relative to the bolt, from a non-expanded starting position into an expanded end position in which the expansion tabs are radially outwardly expanded by the expansion cone. The expansion connector is particularly suitable for parts (panels) made of chipboard, MDF or wood-like materials.

Background of the Invention

Such expansion connectors are well known, such as for example the HÄFELE Minifix C100 expansion bolt.

Expansion connectors are preliminarily inserted either into the end-side bore of the one panel to be joined or into the surface-side bore of the other panel to be joined. Here, in order to ensure the exact position of the expansion connector in an axial direction, expansion connectors have a stop ring on their expansion sleeve, said stop ring preventing the expansion sleeve from being inserted too deeply into the bore. If the stop ring is too small or too thin, there is the risk that the expansion sleeve may slide too deeply into the bore. If the stop ring is too big or too thick, there is the risk that a visible join will remain between the panels after tightening. During the preliminary insertion of expansion connectors into the end-side transverse bore, there is often the problem that the expansion connector sits too loosely and may fall out or sits too tightly and can be inserted only with difficulty.

By contrast, the present invention is based on the object of reliably preventing the formation of a join between two parts to be connected in the case of an expansion connector of the type mentioned in the introduction.

SUMMARY OF THE INVENTION

According to the invention, this object is achieved in that, in the starting position, the expansion tabs bear against the bolt shaft in each case by way of a guide portion whose edge facing the bolt head is axially spaced apart from the tab end facing the bolt head and divides the expansion tabs in each case into a first tab portion facing the bolt head and a second tab portion facing away from the bolt head, and the first tab portions are radially spaced apart from the bolt shaft, and in that, in the end position, the expansion tabs are each pivoted in a rocker-like manner about the edge of the guide portion. Preferably, the bolt is made of metal and overmolded with the expansion sleeve.

According to the invention, in the end position, the second tab portions are pivoted radially outward and the first tab portions together with their collars are pivoted radially inward. This rocking mechanism causes the collars to be retracted radially inward and also has the result that a self-retarding system is created between the expansion cone and the expansion sleeve, said system diverting the tensile forces acting on the expansion cone radially outward into a bore wall. This novel operating principle promises better loading values, especially for panels with a lower material density.

Particularly preferably, an annular flange, against which the first tab portions radially bear in the starting position and which, in the end position, is axially slid past the first tab portions, is provided on the bolt shaft, between the bolt head and the expansion cone. The annular flange prevents the collars from being able to be deflected radially inward in the starting position.

Preferably, in the starting position, the first tab portions taper on the inner side and/or the second tab portions taper on the outer side in the direction towards the expansion cone, in order to create a free space for the pivoting of the expansion tabs. Instead of tapering, the outer and inner diameters of the first and second tab portions may alternatively also decrease in steps or at intervals.

Preferably, the first tab portions, in particular at the tab end facing the bolt head, are connected to one another by connecting webs which are then plastically deformed in the end position. In the starting position, the second tab portions may be connected to one another by predetermined breaking points and their free ends may already be arranged on the expansion cone. Advantageously, at least the second tab portions may have a, for example, barb-like ribbing on the outer side in order to anchor the expanded expansion sleeve firmly in a bore.

In a particularly preferred embodiment of the invention, a plastics centering element is arranged on the bolt shaft, between the bolt head and the expansion sleeve, in particular between the bolt head and the annular flange, said plastics centering element defining an insertion diameter or outer diameter that is coaxial with respect to the bolt. The bolt is preferably overmolded with the centering element. The centering element is used for the preliminary insertion of the expansion connector in a bore of a part to be joined, wherein the outer diameter is selected to be slightly larger than the bore diameter in order to achieve a tight fit in the bore. Optionally, the centering element may have at least two radially resilient outer sides which in particular lie opposite one another with respect to the bolt, in order to compensate for bore tolerances and to provide additional contact pressure.

The invention also relates to an arrangement comprising two parts which are connected to one other by means of an expansion connector configured as above, wherein the expansion sleeve of the expansion connector is inserted into a bore of the one, first part and the expansion tabs are each pivoted about the edge of the guide portion by the expansion cone, as a result of which the second tab portions are pivoted radially outward until they bear against the bore wall of the first bore and the first tab portions are pivoted radially inward. As a result, the collars are retracted radially inward into the bores so that no visible join remains between the two parts.

Preferably, the expansion connector has a plastics centering element on the bolt shaft, between the bolt head and the expansion sleeve, in particular between the bolt head and the annular flange, said plastics centering element being inserted into the bore of the second part. The centering element has radially resilient outer sides which define an insertion diameter or outer diameter that is coaxial with respect to the bolt and that is slightly larger than the bore diameter. These resilient outer sides can compensate for bore tolerances and counteract undesired falling of the expansion connector out of the bore, especially if they have an external ribbing in the form of retaining claws.

Further advantages of the invention emerge from the description, from the claims and from the drawing. The aforementioned features and the features mentioned further below can likewise be employed in each case individually or severally in any desired combinations. The embodiments shown and described should not be understood to be an exhaustive list, but rather have an exemplary character for the purpose of illustrating the invention.

DETAILED DESCRIPTION OF THE PREFERRED EMBODIMENTS

Figure 1:
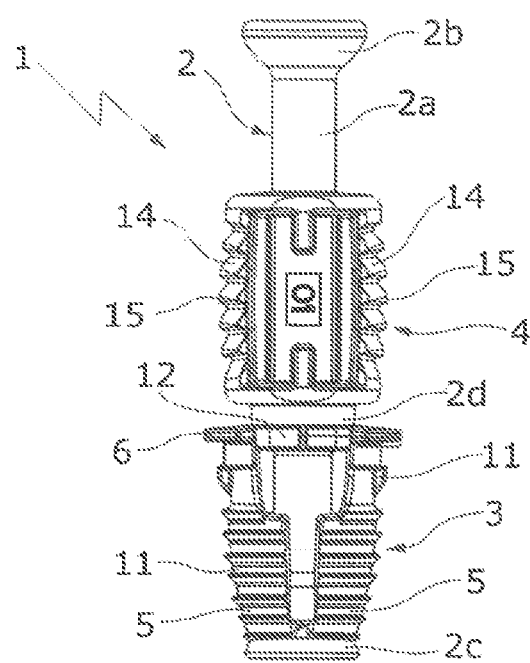
FIG. 1 shows a side view of the expansion connector according to the invention in its starting position.

The expansion connector 1 shown in its starting position in FIG. 1 comprises a bolt 2, a plastics expansion sleeve 3 which can be displaced on the bolt 2 and a plastics centering element 4 which is arranged on the bolt 2. The bolt 2 is, for example, made of steel and overmolded with the expansion sleeve 3 and the centering element 4.

The bolt 2 has a cylindrical bolt shaft 2a, a bolt head 2b at one bolt end, an expansion cone 2c, tapering in the direction towards the bolt head 2b, at the other bolt end and an annular flange 2d, provided on the bolt shaft 2a, between the bolt head 2b and the expansion cone 2c.

The expansion sleeve 3 is arranged on the bolt 2, between the annular flange 2 and the expansion cone 2c, and has two expansion tabs 5 which lie opposite one another with respect to the bolt 2, a respective collar 6 protruding radially outward at that tab end of said expansion tab which faces the bolt head 2b. The collars 6 can be of particularly thick and robust configuration. The expansion tabs 5 bear against the bolt shaft 2a in each case by way of a guide portion 7 whose edge 8 facing the bolt head 2b is axially spaced apart from the tab end facing the bolt head. This edge 8 divides the expansion tabs 5 in each case into a first tab portion 9 facing the bolt head 2b and a second tab portion 10 facing away from the bolt head 2b. The first tab portions 9 are radially spaced apart from the bolt shaft 2a and bear radially against the annular flange 2d at the axial height of the collars 6. The first tab portions 9 taper on the inner side and the second tab portions 10 taper on the outer side in each case in the direction towards the expansion cone 2c. The free ends of the second tab portions 10 are arranged on the expansion cone 2c. Furthermore, the first and second tab portions 9, 10 have a barb-like ribbing 11 on the outer side. The expansion tabs 5 are permanently connected by connecting webs 12 at the tab end facing the bolt head. The tab ends facing the bolt head and the connecting webs 12 together form a ring.

The sleeve-shaped centering element 4 is arranged on the bolt shaft 2a, between the bolt head 2a and the annular flange 2d, in as non-displaceable a manner as possible. The centering element 4 has two radially resilient outer walls 14 which lie opposite one another with respect to the bolt 2 and which each have a barb-like ribbing 15, which defines an insertion diameter or outer diameter that is coaxial with respect to the bolt 2.

Figure 2A:
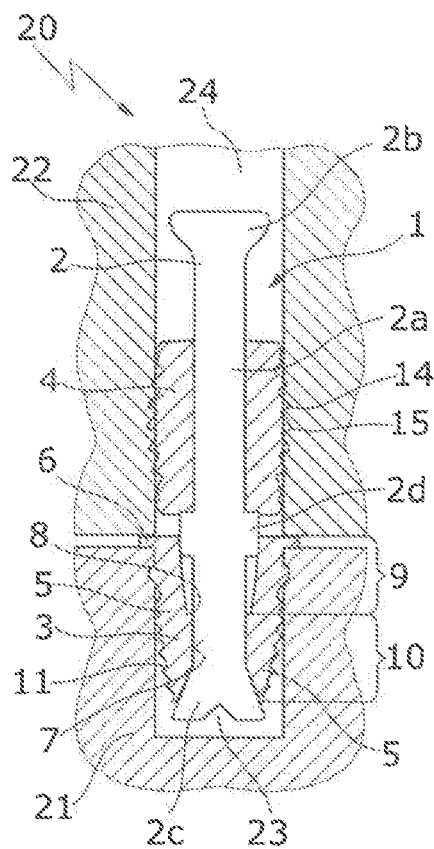
FIGS. 2a, 2b show a longitudinal section of the expansion connector according to the invention in its non-expanded starting position (FIG. 2a) and in its expanded end position (FIG. 2b) during the connection of two furniture panels.
Figure 2B:
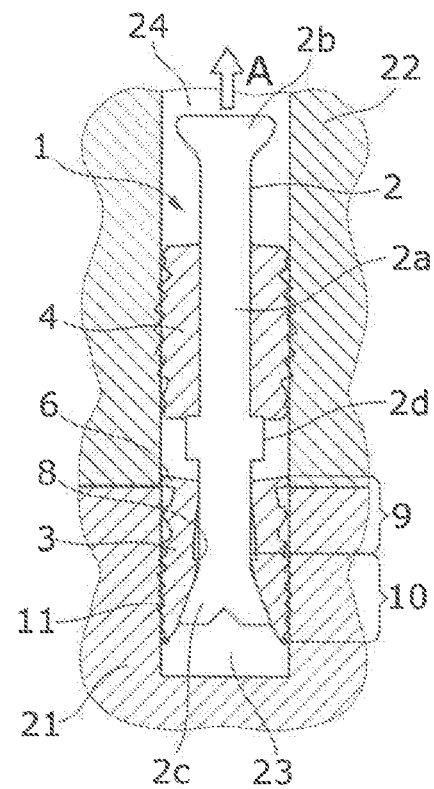

FIGS. 2a, 2b show a furniture arrangement 20 comprising two furniture panels 21, 22 to be joined made of chipboard, MDF or wood-like materials, and comprising the expansion connector 1.

In FIG. 2a, on the one hand, the expansion sleeve 3 of the expansion connector 1 is inserted into an end-side bore 23 of the one, first furniture panel 21 until the collars 6 bear against the first panel 21, and on the other hand, the centering element 4 of said expansion connector is inserted into a surface-side bore 24 of the other, second furniture panel 22. The collars 6 prevent the expansion connector 1 from being inserted too deeply into the end-side bore 23, and the expansion sleeve 3 is retained in the end-side bore 23 by the ribbing 11 of the first tab portions 9, the insertion diameter or outer diameter of which is slightly larger than the bore diameter of the end-side bore 23. The centering element 4 is retained in the surface-side bore 23 by its ribbing 15, the insertion diameter or outer diameter of which is slightly larger than the bore diameter of the surface-side bore 24, wherein the radially inwardly deflected resilient outer sides 14 ensure an additional contact pressure of the ribbing 11 on the bore wall. As shown in FIG. 2a, the two furniture panels 21, 22 do not bear against one another because of the collars 6 located therebetween.

By means of a tightening element (not shown) which is arranged in the second furniture panel 22 and which engages on the bolt head 2a, the bolt 2 is pulled in direction A and, as a result, the expansion connector 1 is transferred from its non-expanded starting position shown in FIG. 2a into the expanded end position shown in FIG. 2b. As a result of the displacement of the bolt 2 relative to the expansion sleeve 3, on the one hand, the annular flange 2d is axially slid past the first tab portions 9, and on the other hand, the second tab portions 10 are radially outwardly expanded by the expansion cone 2c. The expansion of the second tab portions 10 has the effect that the expansion tabs 5 each pivot about the edge 8 of the guide portion 7 in a rocker-like manner and the connecting webs 12 are plastically deformed in the process. As a result of the pivoting of the expansion tabs 5, on the one hand, the second tab portions 10 are pivoted radially outward and their ribbings 11 are thereby pressed into the bore wall of the first bore 23, and on the other hand, the first tab portions 10 are pivoted radially inward, e.g. until they bear against the bolt shaft 2a, as a result of which the collars 6 are retracted into the bores 23, 24 and no visible join between the two furniture panels 21, 22 remains.

What is claimed is:

1. An expansion connector for connecting two parts, comprising:
   a bolt with a cylindrical bolt shaft, with a bolt head at one bolt end and with an expansion cone, tapering in the direction towards the bolt head, at the other bolt end; and
   a plastics expansion sleeve which is mounted displaceably on the bolt and which has at least two expansion tabs, each of which has a radially outwardly protruding collar at their tab end facing the bolt head;

wherein the expansion sleeve can be transferred, by a displacement relative to the bolt, from a non-expanded starting position into an expanded end position in which the expansion tabs are radially outwardly expanded by the expansion cone;

wherein, in the starting position, the expansion tabs bear against the bolt shaft in each case by way of a guide portion whose edge facing the bolt head is axially spaced apart from the tab end facing the bolt head and divides the expansion tabs in each case into a first tab portion facing the bolt head and a second tab portion facing away from the bolt head, and the first tab portions are radially spaced apart from the bolt shaft, and in that, in the end position, the expansion tabs are each pivoted about the edge of the guide portion.

2. The expansion connector as claimed in claim 1, wherein an annular flange, against which the first tab portions radially bear in the starting position and which, in the end position, is axially slid past the first tab portions, is provided on the bolt shaft, between the bolt head and the expansion cone.

3. The expansion connector as claimed in claim 2, wherein, in the end position, the first tab portions are pivoted until they bear against the bolt shaft.

4. The expansion connector as claimed in claim 1, wherein, in the end position, the first tab portions are pivoted until they bear against the bolt shaft.

5. The expansion connector as claimed in claim 1, wherein, in the starting position, the first tab portions taper on an inner side and/or the second tab portions taper on an outer side in the direction towards the expansion cone.

6. The expansion connector as claimed in claim 1, wherein the first tab portions, at the tab end facing the bolt head, are connected to one another by connecting webs which are plastically deformed in the end position.

7. The expansion connector as claimed in claim 1, wherein, in the starting position, free ends of the second tab portions are arranged on the expansion cone.

8. The expansion connector as claimed in claim 1, wherein at least the second tab portions have a barb-like ribbing on an outer side.

9. The expansion connector as claimed in claim 1, wherein the bolt is made of metal and is overmolded with the expansion sleeve.

10. The expansion connector as claimed in claim 1, wherein a plastics centering element is arranged on the bolt shaft, between the bolt head and the expansion sleeve, between the bolt head and the annular flange, said plastics centering element defining an outer diameter that is coaxial with respect to the bolt.

11. The expansion connector as claimed in claim 10, wherein the centering element has at least two radially resilient outer sides which lie opposite one another with respect to the bolt.

12. The expansion connector as claimed in claim 11, wherein the resilient outer sides have a barb-like ribbing.

13. The expansion connector as claimed in one of claim 12, wherein the bolt is made of metal and is overmolded with the centering element.

14. The expansion connector as claimed in one of claim 11, wherein the bolt is made of metal and is overmolded with the centering element.

15. The expansion connector as claimed in claim 10, wherein the resilient outer sides have a barb-like ribbing.

16. The expansion connector as claimed in one of claim 10, wherein the bolt is made of metal and is overmolded with the centering element.

17. An arrangement comprising two parts which are connected to one another by means of the expansion connector as claimed in claim 1, wherein the expansion sleeve is inserted into a bore of the one, first part and the expansion tabs are each pivoted about the edge of the guide portion by the expansion cone, as a result of which the second tab portions are pivoted radially outward until they bear against the bore wall of the first bore and the first tab portions together with their collars are pivoted radially inward.

18. The arrangement as claimed in claim 17, wherein the expansion connector has a plastics centering element on the bolt shaft, between the bolt head and the expansion sleeve, between the bolt head and the annular flange, said plastics centering element having an outer diameter that is coaxial with respect to the bolt and being inserted into a bore of the other, second part.

* * * * *

UNITED STATES PATENT AND TRADEMARK OFFICE
CERTIFICATE OF CORRECTION

PATENT NO. : 12,123,440 B2
APPLICATION NO. : 17/445824
DATED : October 22, 2024
INVENTOR(S) : Ulrich Merz Page 1 of 1

It is certified that error appears in the above-identified patent and that said Letters Patent is hereby corrected as shown below:

In the Claims

Column 6, Claim 13, Line 15, "in one of" should read --in--.

Column 6, Claim 14, Line 18, "in one of" should read --in--.

Column 6, Claim 16, Line 23, "in one of" should read --in--.

Signed and Sealed this
Seventh Day of January, 2025

Derrick Brent
*Acting Director of the United States Patent and Trademark Office*